(12) United States Patent
Hirai

(10) Patent No.: US 6,933,936 B1
(45) Date of Patent: Aug. 23, 2005

(54) INFORMATION PROCESSING APPARATUS, DISPLAY CONTROL METHOD, AND RECORDING MEDIUM

(75) Inventor: Jun Hirai, Tokyo (JP)

(73) Assignee: Sony Corporation, (JP)

(*) Notice: Subject to any disclaimer, the term of this patent is extended or adjusted under 35 U.S.C. 154(b) by 136 days.

(21) Appl. No.: 09/856,233

(22) PCT Filed: Sep. 21, 2000

(86) PCT No.: PCT/JP00/06467

§ 371 (c)(1),
(2), (4) Date: Aug. 16, 2001

(87) PCT Pub. No.: WO01/22204

PCT Pub. Date: Mar. 29, 2001

(30) Foreign Application Priority Data

Sep. 22, 1999 (JP) .................................. 11-268046
Sep. 29, 1999 (JP) .................................. 11-276101

(51) Int. Cl.[7] ............................................. G09G 5/00
(52) U.S. Cl. ...................................... 345/211; 715/716
(58) Field of Search .............................. 345/716–720, 345/733–739, 211–212; 713/300–340; 265/716–720, 265/733–739

(56) References Cited

U.S. PATENT DOCUMENTS 5,167,024 A * 11/1992 Smith et al. ................. 395/375
5,594,426 A * 1/1997 Ushijima et al. ...... 340/825.02
5,675,813 A * 10/1997 Holmdahl .................... 395/750
5,757,366 A * 5/1998 Suzuki ........................ 345/213
5,887,193 A    3/1999 Takahashi et al.
6,473,078 B1 * 10/2002 Ikonen et al. ................ 345/211
6,480,889 B1 * 11/2002 Saito et al. .................. 709/220

FOREIGN PATENT DOCUMENTS

| JP | 7-175557 | 7/1995 |
| JP | 10-155121 | 6/1998 |
| JP | 10-233791 | 9/1998 |
| WO | WO-98/25377 A1 | 6/1998 |

* cited by examiner

Primary Examiner—Jimmy H. Nguyen
Assistant Examiner—Tom Sheng
(74) Attorney, Agent, or Firm—Lerner, David, Littenberg, Krumholz & Mentlik, LLP

(57) ABSTRACT

A control unit inquires each digital apparatus stored in a memory table in a memory about a power supply mode of the apparatus through an IEEE1394 serial bus. When a response indicates a power-on mode, corresponding icons 61-1 and 61-2 are normally displayed. When the response indicates a connection standby mode, a corresponding icon 61-3 is mesh-displayed. If there is no response, corresponding icons 61-4 and 61-5 are inversion-displayed. A connection detecting circuit 111 detects a bias voltage of an IEEE1394 serial bus 101 and outputs a detection signal to a main control circuit 122. On the basis of the input detection signal, the main control circuit 122 controls a power supplying circuit 117 so as to supply a standby electric power to a standby power supplying circuit 116. On the basis of a command from the main control circuit 122, the standby power supplying circuit 116 supplies a standby electric power to a physical connecting circuit 112, a logical connecting circuit 113, and a standby control circuit 121.

23 Claims, 9 Drawing Sheets

Fig. 5
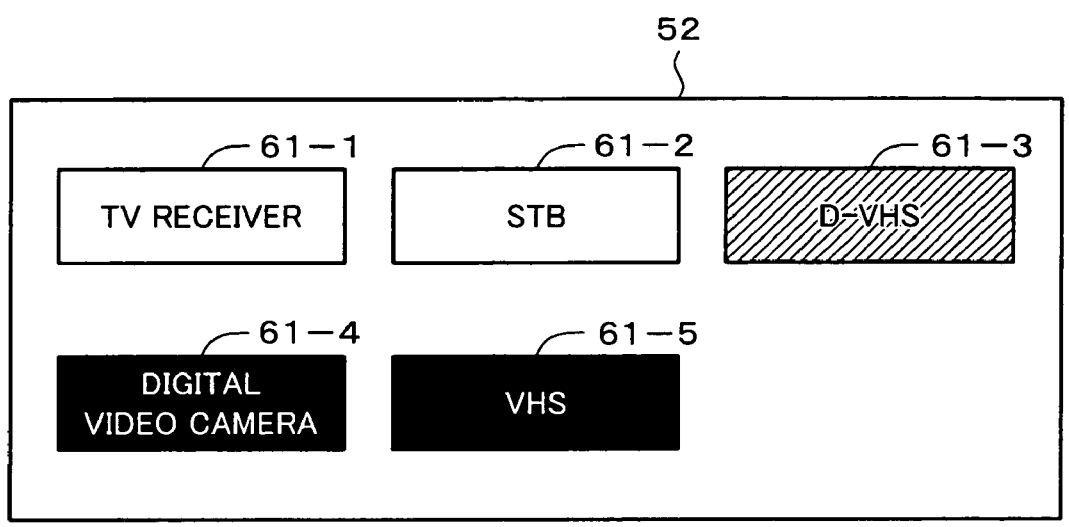
Fig. 6A    Fig. 6B
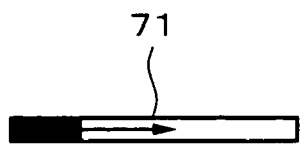    

Fig. 10

| | STANDBY (DISCONNECTION) | STANDBY (CONNECTION) | POWER ON | POWER OFF |
|---|---|---|---|---|
| PHYSICAL CONNECTING CIRCUIT | × | ○ | ○ | × |
| LOGICAL CONNECTING CIRCUIT | × | ○ | ○ | × |
| SIGNAL PROCESSING CIRCUIT | × | × | ○ | × |
| STANDBY CONTROL CIRCUIT | ○ | ○ | ○ | × |
| MAIN CONTROL CIRCUIT | × | ○ | ○ | × |
| STANDBY POWER SUPPLYING CIRCUIT | ○ | ○ | ○ | × |
| CONNECTION DETECTING CIRCUIT | ○ | ○ | ○ | × |

INFORMATION PROCESSING APPARATUS, DISPLAY CONTROL METHOD, AND RECORDING MEDIUM

TECHNICAL FIELD

The invention relates to an information processing apparatus, a display control method, and a recording medium. More particularly, the invention relates to an information processing apparatus, a display control method, and a recording medium, in which in case of, for example, mutually connecting a plurality of digital apparatuses by an IEEE1394 serial bus, a mode of a power source of each digital apparatus is displayed. The invention also relates to an information processing apparatus and a power control method, in which a standby electric power is supplied to only a corresponding circuit from a connecting state of the IEEE1394 serial bus.

BACKGROUND ART

In recent years, even in an ordinary home, digital apparatuses such as a D-VTR (Digital Video Tape Recorder) for recording digital broadcast and the like are being spread. In association with it, the operation such that the digital broadcast is received and outputted to a television receiver and the digital broadcast is monitored or the operation such that the digital broadcast is transferred to the D-VTR and recorded as a digital signal as it is can be easily performed.

For example, the IEEE (The Institute of Electrical and Electronics Engineers) 1394 serial bus having a high degree of freedom of connection and high durability is used for mutual connection of the digital apparatuses.

According to the IEEE1394 serial bus, even when a power source of the electronic apparatus connected thereto is in a standby mode, the power source of the electronic apparatus can be turned on by sending a command. Each electronic apparatus, therefore, is set to the standby mode and a current is always supplied to the apparatus.

However, when the power source of the electronic apparatus is OFF (disconnecting state), since no command can be received, the existence of the electronic apparatus cannot be recognized. Further, there is a problem such that when the number of electronic apparatuses connected to a network increases, it is difficult to distinguish the electronic apparatus in the standby mode including a power-on state from the electronic apparatus in the disconnecting state.

Therefore, although there is a method of always setting the power sources of all of the electronic apparatuses connected to the network into the standby mode, an electric power is supplied even to the electronic apparatus whose use frequency is low, so that there is a problem such that a large electric power (standby electric power) is eventually consumed.

There is also a problem such that since the IEEE1394 serial bus communicates with many apparatuses, in the apparatuses connected to the bus, it is necessary to make many circuits operative and, since the apparatus operates at a high speed, a large electric power (standby electric power) is consumed even in the standby mode.

DISCLOSURE OF INVENTION

The invention is made in consideration of such a situation and intends to display a mode of a power source of each electronic apparatus and enable the power source of the electronic apparatus to be easily managed.

The invention is made in consideration of such a situation and intends to reduce a standby electric power in accordance with a connecting state of a bus.

An information processing apparatus according to an aspect of the invention includes memory means for storing a plurality of apparatuses connected to a network, and display control means for controlling a display of a current supply mode, a standby mode, or a current non-supply mode of the plurality of apparatuses stored in the memory means so that the modes can be distinguished.

Apparatuses disconnected from the network can be also stored in the memory means.

Power input instructing means for instructing a power input through the network can be further provided for the apparatus in the standby mode.

The IEEE1394 serial bus can be used as a network.

A display control method according to a further aspect of the invention includes a storage control step of controlling storage of a plurality of apparatuses connected to a network, and a display control step of controlling a display of a current supply mode, a standby mode, or a current non-supply mode of the plurality of apparatuses stored by the control in the storage control step so that the modes can be distinguished.

A program for a recording medium according to a still further aspect of the invention includes a storage control step of controlling storage of a plurality of apparatuses connected to a network, and a display control step of controlling a display of a current supply mode, a standby mode, or a current non-supply mode of the plurality of apparatuses stored by the control in the storage control step so that the modes can be distinguished.

An information processing apparatus according to another aspect of the invention includes detecting means for detecting a connecting state of a bus; and control means for controlling a supply of an electric power so as to supply the electric power to a predetermined circuit among a plurality of circuits on the basis of a detection result of the detecting means.

The detecting means can detect a bias voltage from a signal line of the bus.

An IEEE1394 serial bus can be used as a bus.

A power control method according to an additional aspect of the invention includes a detecting step of detecting a connecting state of a bus; and a control step of controlling so as to supply the electric power to a circuit among a plurality of circuits on the basis of a detection result in the detecting step.

In the information processing apparatus, the display control method, and the recording medium of the invention, the plurality of apparatuses connected to the network are stored and the display of the current supply mode, standby mode, or current non-supply mode of the plurality of apparatuses is controlled so that the modes can be distinguished. In the information processing apparatus and the power control method of the invention, the connecting state of the bus is detected and the electric power is supplied to the predetermined circuit on the basis of the detection result.

BRIEF DESCRIPTION OF DRAWINGS

FIG. 5 is a diagram for explaining icons 61-1 to 61-5 which are displayed on an output unit 52 in FIG. 2;

FIG. 6 is a diagram for explaining bar graphs;

FIG. 10 is a diagram for explaining a supply of an electric power to each circuit corresponding to a connecting state of a bus.

BEST MODE FOR CARRYING OUT THE INVENTION

Figure 1:
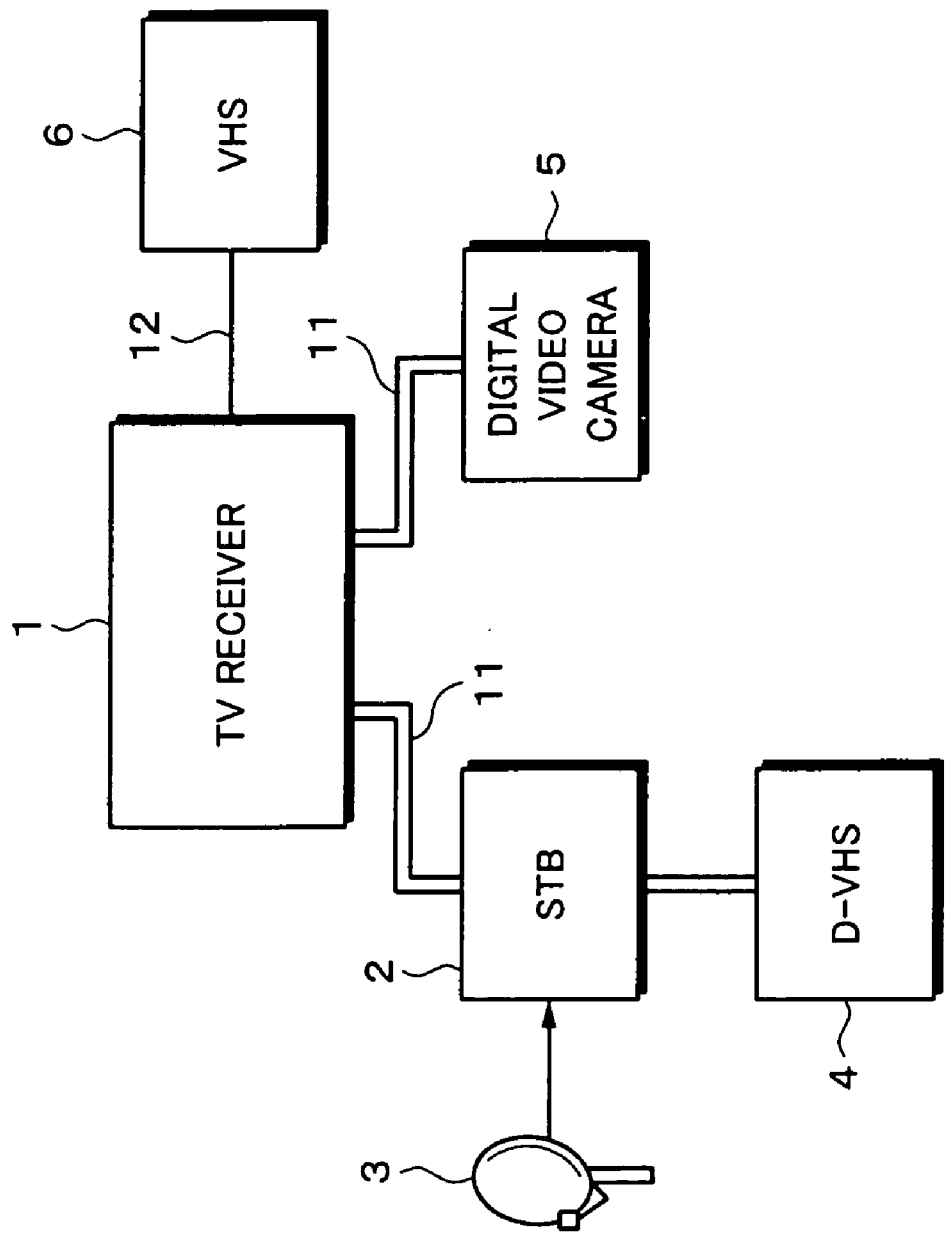
FIG. 1 is a block diagram showing a construction of a network system to which the invention is applied.

FIG. 1 shows a constructional example of a network system to which the invention is applied. A television receiver 1 is connected to an STB (Set Top Box) 2 through an IEEE1394 serial bus 11. The STB 2 is connected to a D-VHS (Digital Video Home System) (trademark) 4 as a digital video tape recorder through the IEEE1394 serial bus 11. The STB 2 demodulates a signal of a predetermined channel from a reception signal of a satellite broadcast wave received by a parabolic antenna 3.

A digital video camera 5 is connected to the television receiver 1 through the IEEE1394 serial bus 11. A VHS 6 as an analog video tape recorder is also connected to the TV receiver 1 through an analog cord 12.

Figure 2:
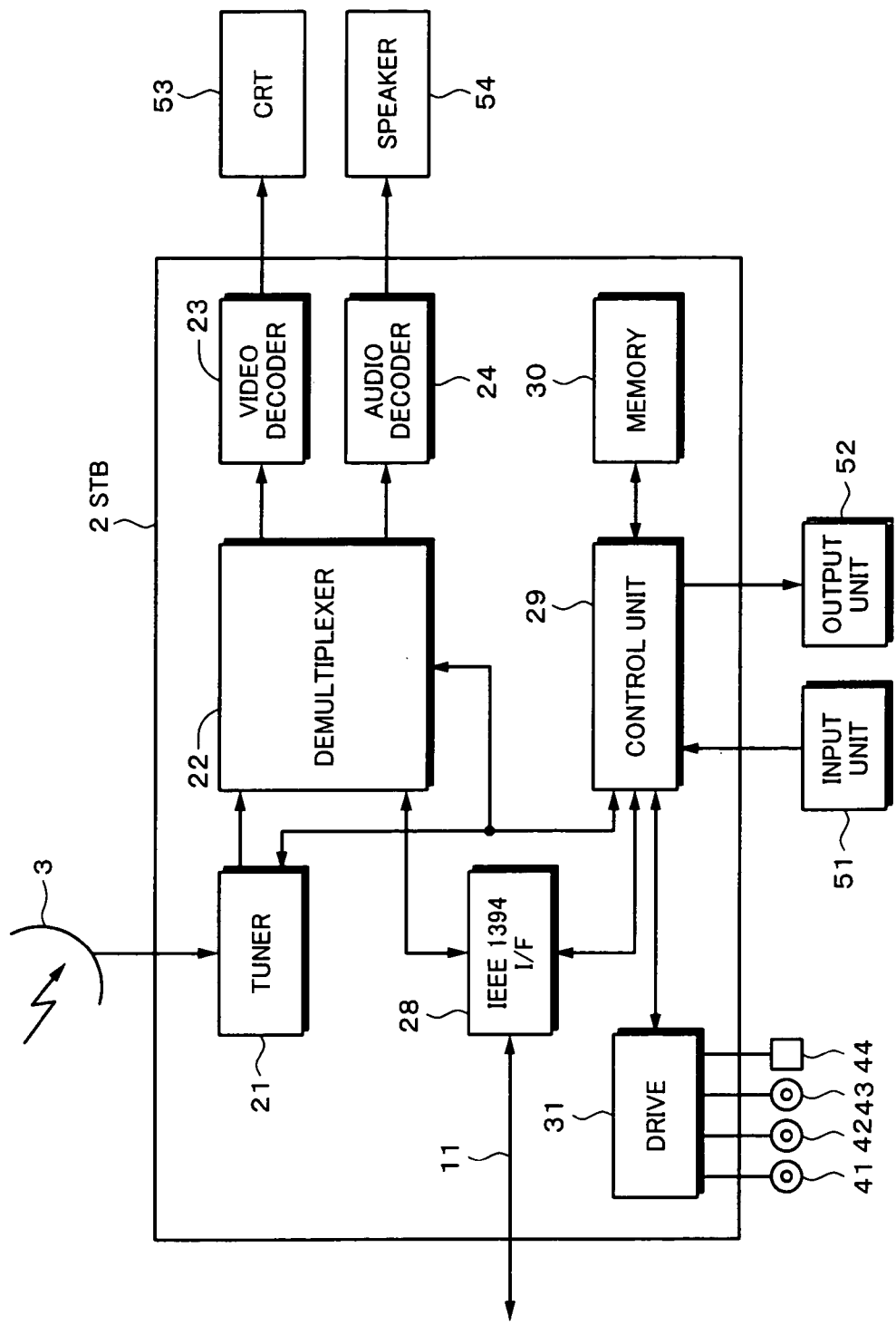
FIG. 2 is a block diagram showing a constructional example of an STB 2 in FIG. 1.

The STB 2 is constructed as shown in, for example, FIG. 2. A tuner 21 receives a signal of a predetermined transmission channel (transmission channel including a broadcast channel instructed from a control unit 29) from the reception signal of the broadcast wave received by the parabolic antenna 3 on the basis of a command from the control unit 29 and outputs it to a demultiplexer 22.

The demultiplexer 22 extracts the signal of a predetermined broadcast channel from the inputted signal of the transmission channel on the basis of a command from a control unit 29, outputs a video signal in the extracted signal to a video decoder 23, and outputs an audio signal to an audio decoder 24, respectively. The demultiplexer 22 also extracts a signal of a desired broadcast channel to be recorded and supplies it to an IEEE1394 interface (I/F) 28.

If the supplied video signal has been compressed by an MPEG (Moving Picture Experts Group) format or the like, the video decoder 23 decompresses it, corrects a delay time between an audio sound and a video image due to the compression and decompression, and outputs the video signal to a CRT (Cathode Ray Tube) 53. If the supplied audio signal has been compressed, the audio decoder 24 decompresses it and outputs it as an analog audio signal to a speaker 54. The CRT 53 displays a video image corresponding to the input video signal. The speaker 54 reproduces the input audio sound.

The IEEE1394 interface 28 outputs the signal supplied from the demultiplexer 22 to the IEEE1394 serial bus 11 and supplies the signal from the IEEE1394 serial bus 11 to the demultiplexer 22.

The control unit 29 controls the tuner 21, demultiplexer 22, and memory 30 on the basis of a command from an input unit 51. The control unit 29 allows a category of the apparatus, a name of a manufacturer, a function, a node unique ID, and the like as specification (property) information of each of the digital apparatuses (television receiver 1, D-VHS 4, and digital video camera 5) which is inputted from the IEEE1394 interface 28 through the IEEE1394 serial bus 11 to be stored into a memory table in the memory 30. The VHS 6 as an analog apparatus cannot be directly connected to the IEEE1394 serial bus 11 as a digital bus. Thus, the IEEE1394 interface 28 cannot detect the VHS 6. Accordingly, the user operates the input unit 51, so that the property information of the VHS is directly inputted.

The input unit 51 is constructed by, for example, a remote commander or the like and operated by the user when the user inputs various commands to the control unit 29. An output unit 52 is constructed by, for example, an LCD (Liquid Crystal Display) or the like, selects a predetermined type from the memory table stored in the memory 30 on the basis of a command from the control unit 29 and displays it. A magnetic disk 41, an optical disk 42, a magnetooptic disk 43, a semiconductor memory 44, or the like can be inserted into a drive 31.

Figure 3:
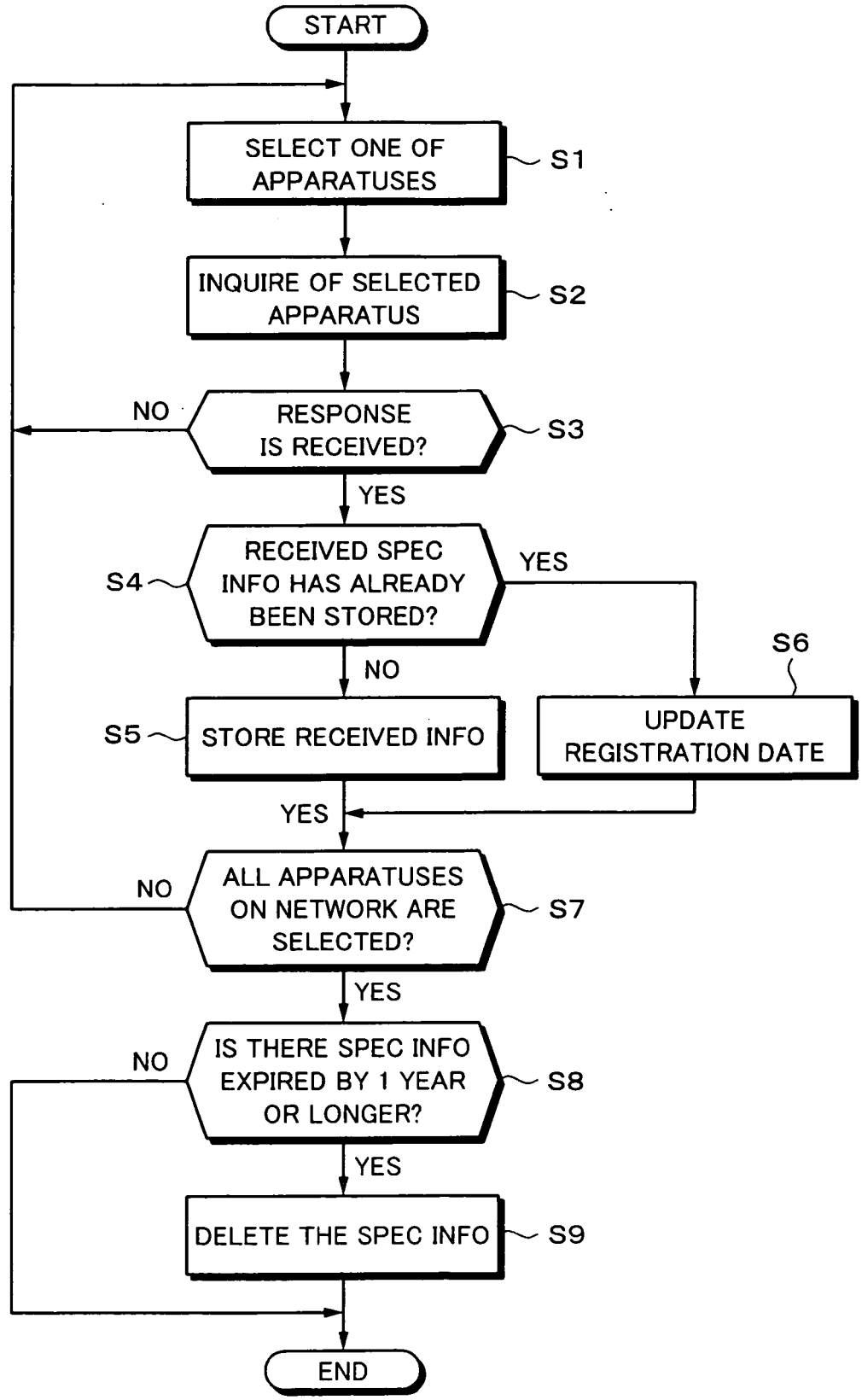
FIG. 3 is a flowchart for explaining a specification information collecting process.

The specification information collecting process which is executed every bus reset will now be described with reference to a flowchart of FIG. 3.

In step S1, the control unit 29 selects one of the digital apparatuses connected to the network. In step S2, the control unit 29 inquires the apparatus selected in step S1 of the property information of the apparatus from the IEEE1394 interface 28 through the IEEE1394 serial bus 11.

In step S3, the control unit 29 discriminates whether a response has been received from the apparatus inquired in step S2 or not. If it is determined that no response is received, the processing routine is returned to step S1 and the foregoing processes are repeated. If it is decided in step S3 that the response has been received, step S4 follows and the control unit 29 discriminates whether the received property information has already been recorded in the memory table in the memory 30 or not.

If it is determined in step S4 that the property information is not recorded in the memory table yet, step S5 follows. The control unit 29 allows the received property information to be stored into the memory table in the memory 30 together with the date. If it is decided in step S4 that the received property information has already been stored in the memory table, step S6 follows. The control unit 29 updates the date of the registration of the corresponding property information stored in the memory table in the memory 30.

After the process in step S5 or S6, the control unit 29 discriminates whether all of the digital apparatuses connected to the network have been selected or not in step S7. If it is determined that all of the apparatuses are not selected yet, the processing routine is returned to step S1 and the foregoing processes are repeated.

If it is determined in step S7 that all of the digital apparatuses connected to the network have been selected, step S8 follows. The control unit 29 discriminates whether the property information whose registration date has expired by one year or more exists in the property information stored in the memory table in the memory 30 or not. If it is decided that the property information whose registration date has expired by one year or more, step S9 follows. The control unit 29 deletes the property information whose registration date has expired by one year or more exists from the property information stored in the memory table in the memory 30. The processing routine is finished. If it is decided in step S8 that the property information whose registration date has expired by one year or more does not exist, the process in step S9 is skipped. The processing routine is finished.

Although whether the registration date has expired by one year or more or not is discriminated in the above example, the number of days in such a case can be arbitrarily set.

Figure 4:
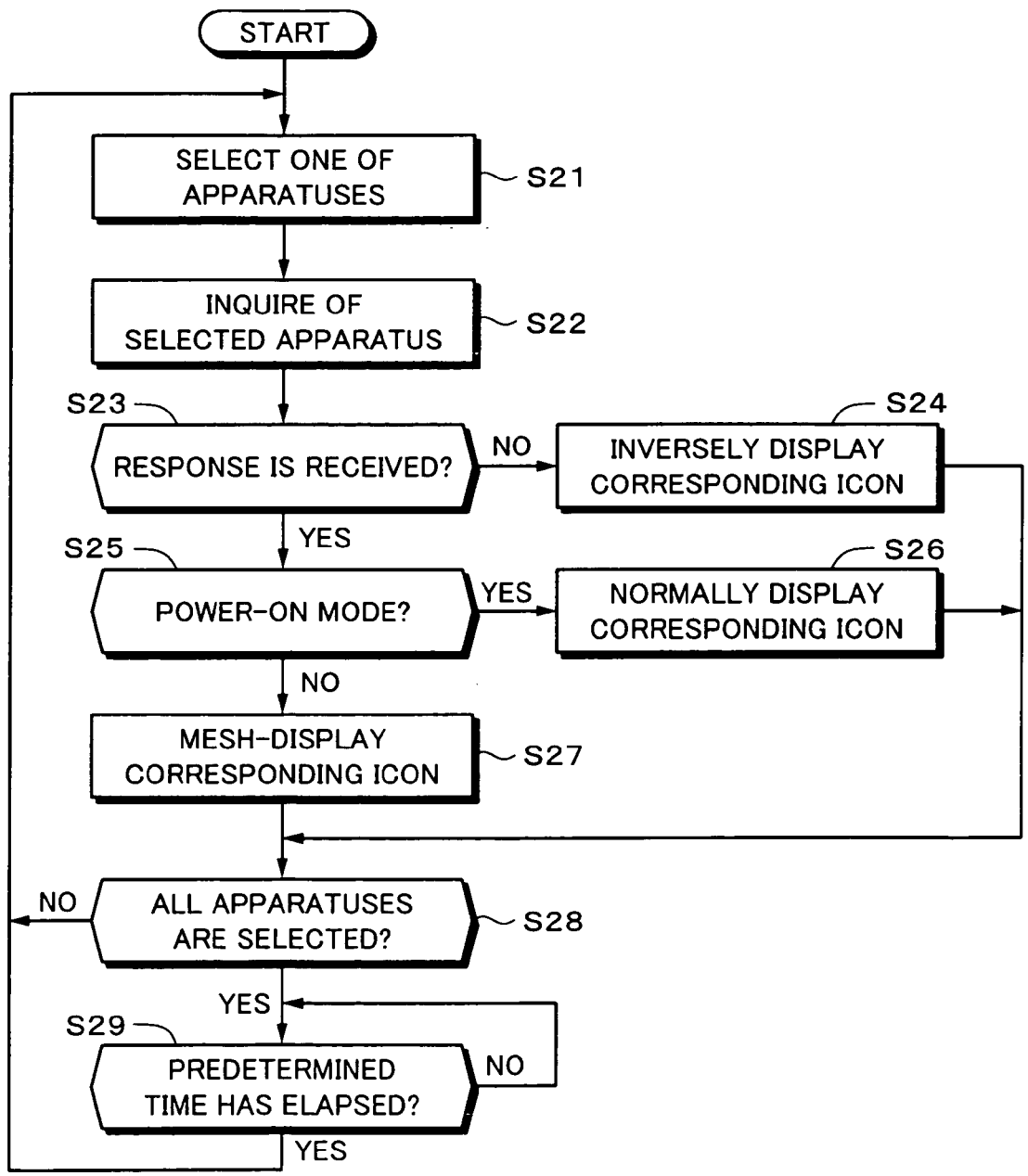
FIG. 4 is a flowchart for explaining a power managing process.

The power managing process which is executed every predetermined time will now be described with reference to a flowchart of FIG. 4.

In step S21, the control unit 29 selects one of the digital apparatuses (property information) stored in the memory table in the memory 30. In step S22, the control unit 29 inquires the apparatus selected in step S21 of a power supply mode of such an apparatus through the IEEE1394 serial bus 11 from the IEEE1394 interface 28. In step S23, the control unit 29 discriminates whether a response has been received from the apparatus inquired in step S22 or not, that is, whether the connecting state is in the disconnection mode (since the apparatus whose power source is OFF can neither receive an inquiry nor return the response, when no response is returned, it is determined that the apparatus is in the disconnection mode) or not. If it is decided that no response is received, step S24 follows. The control unit 29 selects the tape of apparatus from the property information stored in the memory table in the memory 30 and allows the icon corresponding to the apparatus whose mode has been determined as a disconnection mode to be inversion-displayed on the output unit 52. For example, as shown in FIG. 5, if the apparatus is the digital video camera 5, an icon 61-4 corresponding thereto is inversion-displayed.

If it is decided in step S23 that the response has been received, step S25 follows. The control unit 29 discriminates whether the power supply mode of the received response is a power-on mode or not. If it is decided that the power supply mode is the power-on mode, step S26 follows. The control unit 29 selects the type of such an apparatus from the property information stored in the memory table in the memory 30 and allows the icon corresponding to such an apparatus which has been determined to be the power supply mode to be normally displayed on the output unit 52. For example, as shown in FIG. 5, if the apparatus is the television receiver 1, the icon 61-1 corresponding to it is normally displayed.

If it is determined in step S25 that the power supply mode of the response is not the power-on mode, step S27 follows. Since the power supply mode of the response is the connection standby mode (standby mode in which although a main power switch is ON, a sub power switch is OFF), the control unit 29 selects the type of such an apparatus from the property information stored in the memory table in the memory 30 and allows the icon corresponding to the apparatus whose power supply mode has been determined to be the connection standby mode to be mesh-displayed on the output unit 52. For example, if the apparatus is the D-VHS 4 as shown in FIG. 5, the icon 61-3 corresponding to such an apparatus is mesh-displayed.

After the processes in steps S24, S26, and S27, the control unit 29 discriminates whether all of the digital apparatuses stored in the memory table in the memory 30 have been selected or not in step S28. If it is determined that all of the digital apparatuses are not selected yet, the processing routine is returned to step S21 and the foregoing subsequent processes are repeated. If it is determined in step S28 that all of the digital apparatuses have been selected, the processing routine advances to step S29 and the control unit 29 discriminates whether a predetermined time has elapsed or not. If it is decided that the predetermined time does not elapse, the apparatus waits until it is determined that the predetermined time has elapsed in step S29. The predetermined time can be arbitrarily set. If it is decided that the predetermined time has elapsed, the processing routine is returned to step S21 and the foregoing processes are repeated. In the example of FIG. 5, further, the self icon 61-2 is normally displayed and the icon 61-5 of the VHS 6 is inversion-displayed.

As mentioned above, since the power supply mode is inquired every predetermined time and the corresponding icon is displayed on the basis of its response, the user can easily confirm the power supply mode of each apparatus from the display state of the icon.

Figure 7:
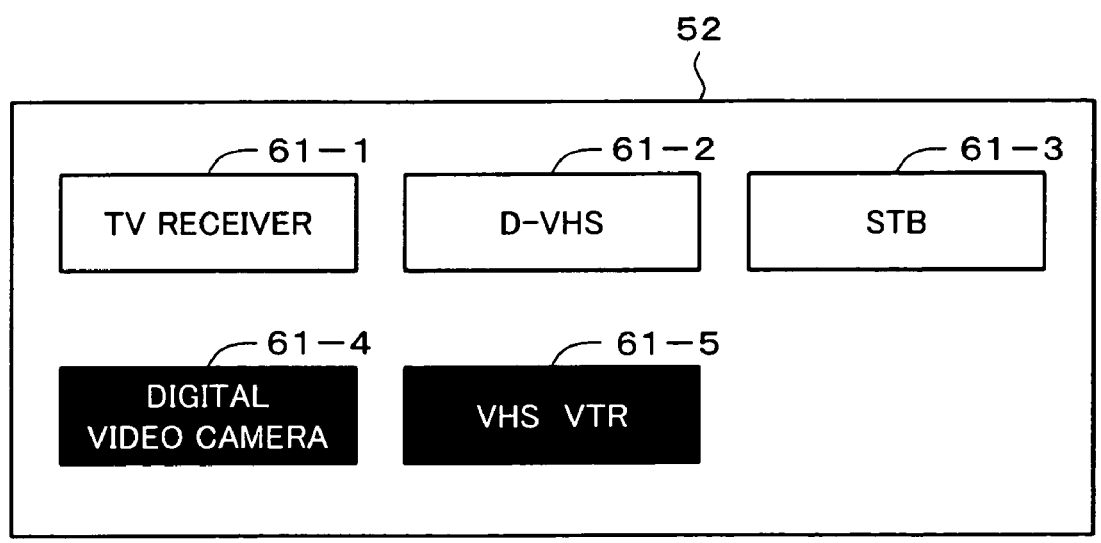
FIG. 7 is a diagram for explaining the icons 61-1 to 61-5 which are displayed on the output unit 52 in FIG. 2.

When the icon of the connection standby mode (icon 61-3 in the example of FIG. 5) among the foregoing icons is clicked, a power-on command is transmitted to the apparatus corresponding to the icon. For example, although the icon 61-3 in FIG. 5 now indicates the connection standby mode, if this icon is clicked by the user, the power-on command is transmitted to the corresponding apparatus (D-VHS 4 in this case). At this time, for a time interval from the transmission of the power-on command to the switching from the mode of the D-VHS 4 to the power-on mode, the control unit 29 of the STB 2 allows a bar graph 71 to be displayed on the output unit 52 (for example, LCD) as shown in FIG. 6(A), thereby enabling the user to confirm the fact that the command has been sent. After completion of the transmission of the command, the bar graph 71 becomes as shown in FIG. 6(B). The icon 61-3 is changed to the normal display as shown in FIG. 7.

Since each digital apparatus is inquired the power supply mode through the IEEE1394 serial bus 11 and the icon corresponding to the power-on mode, connection standby mode, or disconnection mode is displayed as mentioned above, the power source can be easily managed. In case of the connection standby mode, even if the power switch of the apparatus is not directly turned on, by clicking its icon, the power-on command is transmitted. Therefore, the mode can be easily switched even for an apparatus installed at a remote location.

Although the category of the apparatus in the property information stored in the memory table has been displayed on the icon in the above example, according to the invention, the other items such as name of manufacturer, function, node unique ID, and the like can be also displayed. Further, although the icons 61-1 to 61-5 have been normally displayed, mesh-displayed, or inversion-displayed in order to distinguish the modes of the power source, an arbitrary display method can be used so long as three modes of the power source can be distinguished by, for example, colors or the like.

Software to execute the foregoing series of processes is installed from the recording medium into a computer in which a program constructing the software has been built in dedicated hardware or, for example, into a general personal computer or the like in which various functions can be executed by installing various programs.

As shown in FIG. 2, the recording medium is constructed not only by the control unit 29 which is provided for the user in a state where it has previously been built in the STB 2 and in which the program has been recorded but also by a package media comprising the magnetic disk 41 (including a floppy disk), optical disk 42 (including a CD-ROM (Compact Disk-Read Only Memory), DVD (Digital Versatile Disk)), magnetooptic disk 43 (including an MD (Mini-Disk)), semiconductor memory 44, or the like which is distributed to provide the program to the user separately from the computer and in which the program has been recorded.

In the specification, a step of describing the program which is recorded into the recording medium includes not only processes which are time-sequentially executed in the disclosed order but also processes which are executed in parallel or individually even if they are not always time-sequentially executed.

In the specification, the system shows the whole apparatus constructed by a plurality of apparatuses.

Figure 8:
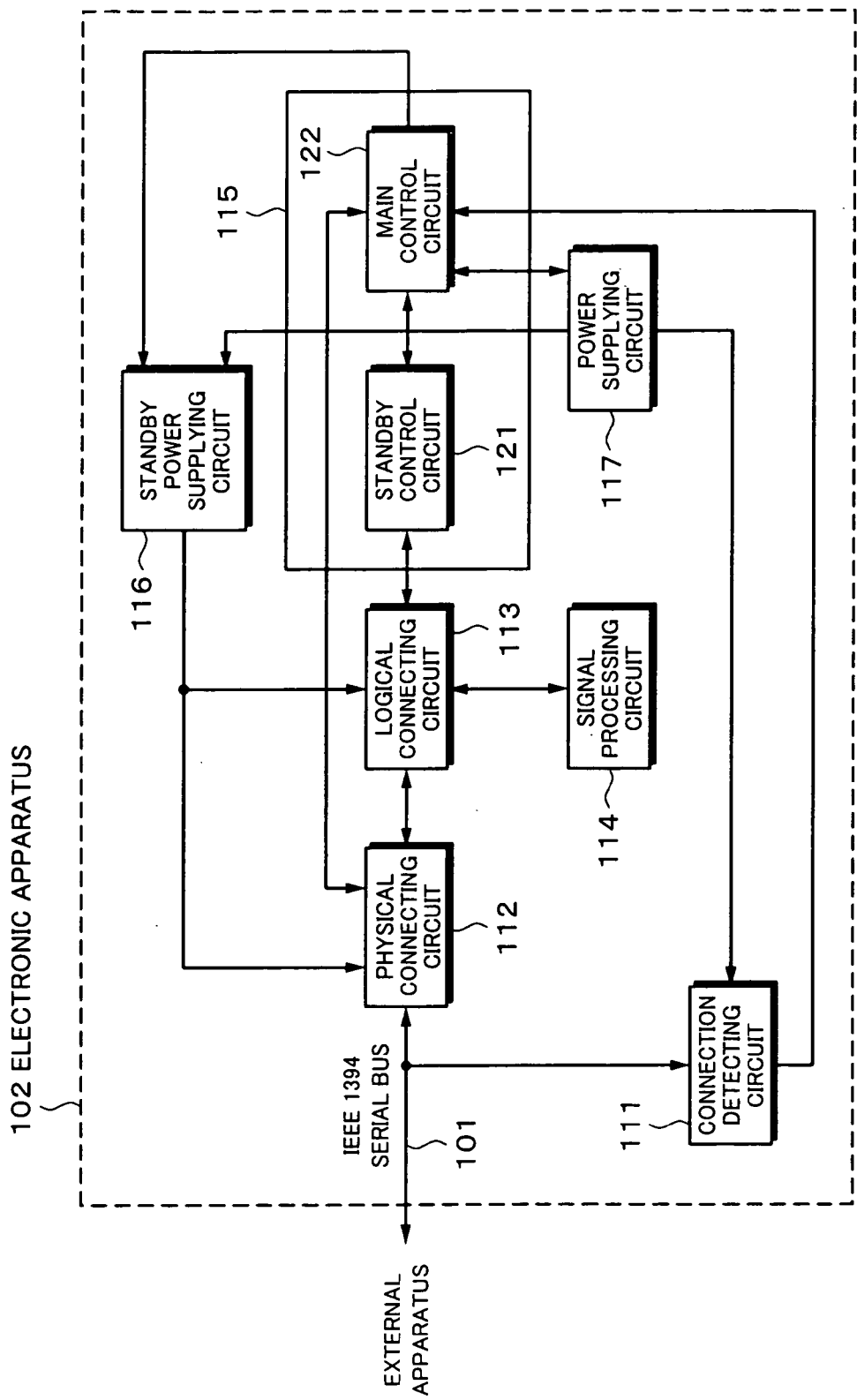
FIG. 8 is a block diagram showing a constructional example of an electronic apparatus to which the invention is applied.

A construction of an electronic apparatus which can reduce a standby electric power in accordance with a connecting state of the bus will now be described with reference to FIG. 8. Although the foregoing STB 2 will be described as an example as an electronic apparatus 102, an apparatus such as television receiver, D-VHS, digital video camera, or the like can be also used. The electronic apparatus 102 is connected to an external apparatus (for example, personal computer) through an IEEE1394 serial bus 101. A plug (not shown) of the IEEE1394 serial bus 101 is connected to a terminal of a physical connecting circuit 112. Thus, in the electronic apparatus 102, a supply of digital data transmitted from the external apparatus through the IEEE1394 serial bus 101 is received by the physical connecting circuit 112 and the digital data is transmitted from the physical connecting circuit 112 to the external apparatus through the IEEE1394 serial bus 101.

A connection detecting circuit 111 detects a bias voltage of the IEEE1394 serial bus 101 and outputs a detection signal to a main control circuit 122 of a control circuit 115. The physical connecting circuit 112 is constructed by, for example, an IEEE1394 digital interface or the like, amplifies the digital data inputted through the IEEE1394 serial bus 101, and outputs it to a logical connecting circuit 113. The physical connecting circuit 112 also amplifies the digital data inputted from the logical connecting circuit 113 and outputs it to the external apparatus through the IEEE1394 serial bus 101.

The logical connecting circuit 113 depacketizes the digital data which was inputted from the physical connecting circuit 112 and has been packetized and multiplexed, thereby separating it into a video signal, an audio signal, and a control signal. The circuit 113 outputs the video signal and audio signal to a signal processing circuit 114 and outputs the control signal to a standby control circuit 121 of the control circuit 115. The logical connecting circuit 113 also executes an addition of an error correction code, a multiplexing process, and the like to the video signal or audio signal inputted from the signal processing circuit 114 and outputs the resultant signal to the physical connecting circuit 112.

The signal processing circuit 114 supplies the inputted video signal and audio signal to built-in video decoder and audio decoder (they are not shown), respectively. The video decoder decodes the inputted video data and outputs it to a CRT (Cathode Ray Tube) (not shown) as necessary. The audio decoder decodes the inputted audio data and outputs it to a speaker (not shown) as necessary. The signal processing circuit 114 also encodes the video signal and audio signal by the built-in-video encoder and audio encoder and outputs them to the logical connecting circuit 113.

The standby control circuit 121 outputs a signal corresponding to the control signal inputted from the logical connecting circuit 113 to the main control circuit 122. When a power switch (main power source) of the main body is turned on by the user, the standby control circuit 121 supplies its command (control signal) to the main control circuit 122.

The main control circuit 122 is constructed by, for example, a microcomputer or the like and controls a power supplying circuit 117 so as to supply an electric power to a standby power supplying circuit 116 on the basis of the detection signal inputted from the connection detecting circuit 111. The main control circuit 122 also controls the power supplying circuit 117 so as to supply an electric power to the signal processing circuit 114 on the basis of a command (command to turn on the main power source) from the user.

The standby power supplying circuit 116 supplies a standby electric power to the physical connecting circuit 112, logical connecting circuit 113, and standby control circuit 121 on the basis of a command from the main control circuit 122. When a power plug (not shown) is connected to a power plug terminal of the electronic apparatus 102 and the power switch (not shown) is ON, the power supplying circuit 117 supplies the standby electric power to the connection detecting circuit 111 and main control circuit 122. The power supplying circuit 117 also supplies the electric power to the standby power supplying circuit 116 or signal processing circuit 114 on the basis of a command from the main control circuit 122.

Figure 9:
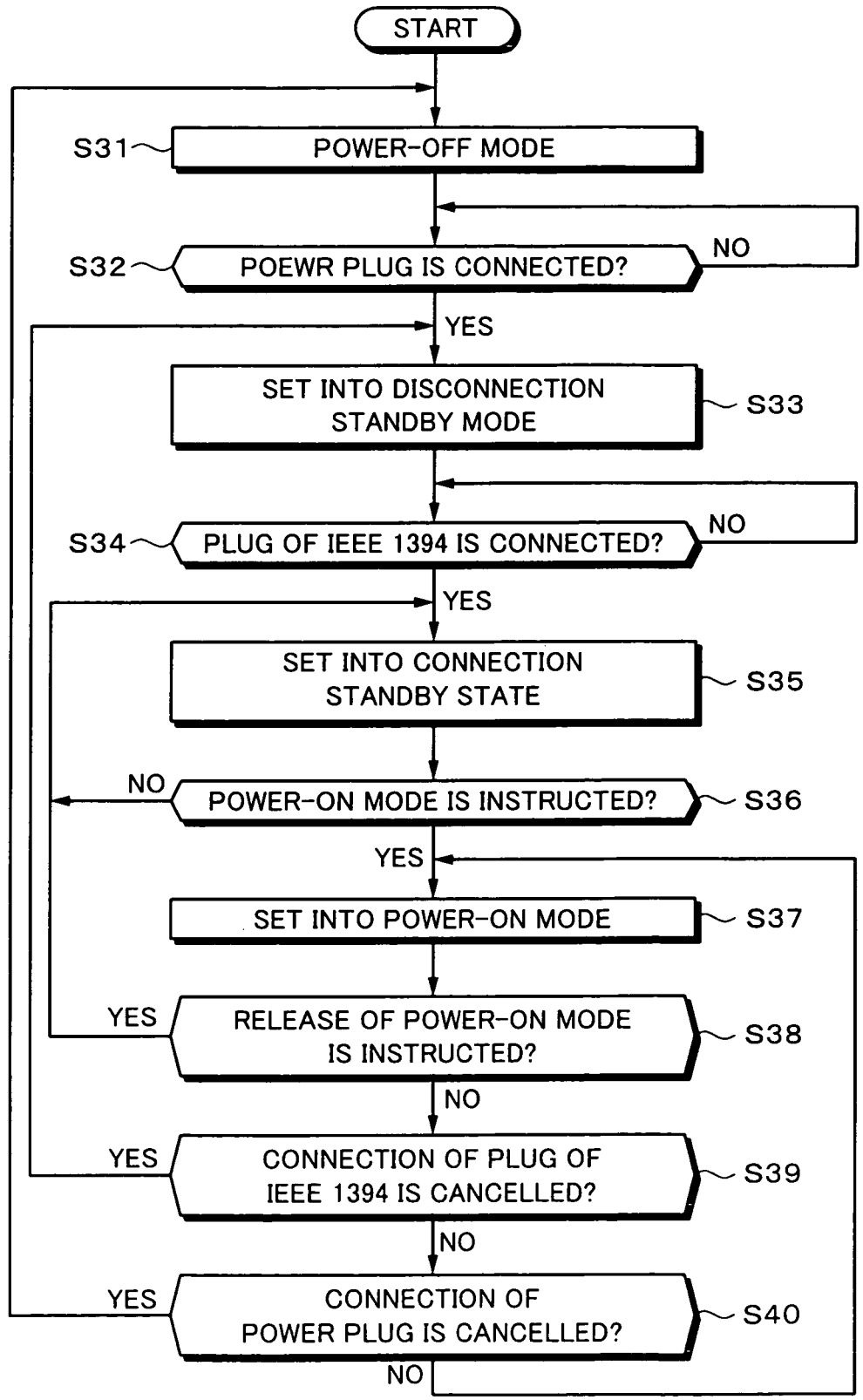
FIG. 9 is a flowchart for explaining processes for supplying an electric power to each circuit in the electronic apparatus in FIG. 8.

A specific example of the operation for detecting the connecting state of the IEEE1394 serial bus 101 and supplying the electric power to each circuit on the basis of its detection result will now be described with reference to a flowchart of FIG. 9.

In step S31, the power supplying circuit 117 sets the mode of the electronic apparatus 102 into a power-off mode. That is, the power supplying circuit 117 does not supply an electric power to all of the circuits (connection detecting circuit 111, physical connecting circuit 112, logical connecting circuit 113, signal processing circuit 114, standby power supplying circuit 116, standby control circuit 121, and main control circuit 122) as shown in FIG. 10(D). In the diagram, o indicates that the electric power is supplied from the power supplying circuit 117 and x denotes that the electric power is not supplied from the power supplying circuit 117. At this time, no electric power is supplied.

In step S32, the power supplying circuit 117 discriminates whether the power plug has been connected to the power plug terminal of the electronic apparatus 102 or not (and whether the main power switch has been turned on or not). If it is determined that the power plug is not connected, the apparatus waits until it is determined that the power plug has been connected in step S32.

If it is determined that the power plug has been connected (and that the main power switch has been turned on) in step S32, in step S33, the power supplying circuit 117 sets the disconnection standby mode and supplies a standby electric power to the connection detecting circuit 111 and main control circuit 122 (FIG. 10(A)). Thus, when the detection signal showing that the IEEE1394 serial bus 101 has been connected is inputted from the connection detecting circuit 111, the main control circuit 122 can shift the mode of the electronic apparatus 102 from the disconnection (state where the IEEE1394 serial bus 1 is not connected) standby mode to the connection standby mode (standby mode in a state where the IEEE1394 serial bus 1 has been connected). In the disconnection standby mode, since the number of circuits to which the electric power is supplied is smaller than that in the case of the connection standby mode or power-on mode, the electric power consumption can be suppressed by an amount corresponding to it.

In step S34, the connection detecting circuit 111 discriminates whether the plug of the IEEE1394 serial bus 101 has been connected to the physical connecting circuit 112 or not, that is, whether a bias voltage has been detected from the IEEE1394 serial bus 101 or not. If it is determined that the plug of the IEEE1394 serial bus 101 is not connected, the apparatus waits until it is determined that the plug of the IEEE1394 serial bus 101 has been connected.

In step S34, if it is determined that the plug of the IEEE1394 serial bus 101 has been connected, the connection detecting circuit 111 outputs the detection signal to the main control circuit 122. At this time, in step S35, the main control circuit 122 controls the power supplying circuit 117 so as to set the connection standby mode and allows the standby power supplying circuit 116 to supply an electric power. The standby power supplying circuit 116 supplies a standby electric power to the physical connecting circuit 112, logical connecting circuit 113, and standby control circuit 121 on the basis of a command from the main control circuit 122 (FIG. 10(B)).

Thus, for example, when the power-on command is sent from the external apparatus through the IEEE1394 serial bus 101 or the self sub power switch is turned on, the electronic apparatus 102 (main control circuit 122) can be set to the power-on mode. Although in the connection standby mode, an electric power larger than that in the disconnection standby mode is consumed, an electric power smaller than that in the power-on mode is consumed.

In step S36, the main control circuit 122 discriminates whether the user turns on the sub power switch or the command of the power-on mode has been sent from the external apparatus and the power-on mode has been instructed or not. If it is determined that the power-on mode is not instructed, the processing routine is returned to step S35 and the foregoing processes are repeated. If it is determined in step S36 that the power-on mode has been instructed, the main control circuit 122 controls the power supplying circuit 117 so as to supply an electric power to the signal processing circuit 114 in step S37 (FIG. 10(C)), thereby shifting the mode of the electronic apparatus 102 (the mode is at present the connection standby mode) to the power-on mode. At this time, although the largest electric power is consumed, the electronic apparatus 102 enters a state where all of the processes can be performed.

In step S38, the power supplying circuit 117 discriminates whether the release of the power-on mode has been instructed from an external apparatus or the self sub power switch has been operated and such a release has been instructed or not. If the release is instructed, the processing routine is returned to step S35 and the mode is shifted to the operation standby mode. Further, the processing routine advances to step S36 and the foregoing subsequent processes are executed. If the release of the power-on mode is not instructed, step S39 follows. The connection detecting circuit 111 discriminates whether the connection of the plug of the IEEE1394 serial bus 101 has been released or not, that is, whether no bias voltage is detected from the IEEE1394 serial bus 101 or not. If it is decided that the connection of the plug of the IEEE1394 serial bus 101 is not released, step S40 follows and the power supplying circuit 117 discriminates whether the connection of the power plug has been released or not. If it is determined that it is not released, the processing routine is returned to step S37 and the foregoing processes are repeated.

If it is decided in step S39 that the connection of the plug of the IEEE1394 serial bus 101 has been released, the main control circuit 122 returns to step S33 and shifts the mode of the electronic apparatus 102 (the mode is at present the power-on mode) to the disconnection standby mode. Further, step S34 follows and the foregoing subsequent processes are repeated. If it is decided in step S40 that the connection of the power plug has been released, the main control circuit 122 returns to step S31 and shifts the mode of the electronic apparatus 102 (the mode is at present the power-on mode) to the power-off mode. Further, step S102 follows and the foregoing subsequent processes are repeated.

As mentioned above, when the main power switch is turned on, to detect the bias voltage of the IEEE1394 serial bus 101, the standby electric power is supplied to the connection detecting circuit 111 and main control circuit 122. Thus, when the plug of the IEEE1394 serial bus 101 is connected to the terminal of the physical connecting circuit 111, the connection detecting circuit 111 detects the bias voltage. The main control circuit 122 receives the input of the detection signal and controls the power supplying circuit 117 so as to supply an electric power to the standby power supplying circuit 116. The standby power supplying circuit 116 further supplies a standby electric power to the physical connecting circuit 112, logical connecting circuit 113, and standby control circuit 121. Therefore, the electric power can be supplied only to a predetermined circuit in accordance with the connecting state of the bus.

Although the case of detecting the bias voltage of the IEEE1394 serial bus 101 in order to detect the connection standby mode of the bus has been described above as an example, the invention can be also constructed in a manner such that a contact to observe the conduction of a shield outside of the plug of the IEEE1394 serial bus 101 is provided on the reception side of the plug and the connection standby mode (the plug has been connected) is physically detected.

Although the case of detecting the connecting state of the IEEE1394 serial bus 101 has been described above as an example, the invention can be also applied to a case of detecting a connecting state of another bus.

As mentioned above, according to the information processing apparatus, the display control method of the invention, and the recording medium, a plurality of apparatuses connected to the network are stored and the display of the current supply mode, standby mode, or current non-supply mode of the plurality of stored apparatuses is controlled so that the modes can be distinguished. Therefore, the power source of the electronic apparatus can be easily managed.

According to the information processing apparatus and the power control method of the invention, since the connecting state of the bus is detected and the electric power is supplied to a predetermined circuit based on the detection result, the waste standby electric power can be reduced.

What is claimed is:

1. An information processing apparatus connected to a plurality of other apparatuses via a network, said apparatus comprising:

inquiring means for querying a respective one of the plurality of other apparatuses as to its power mode;

discriminating means for determining that the power mode of the respective apparatus is a power-off mode when a response from the respective apparatus is not detected, and, when a response from the respective apparatus is detected, for determining whether the power mode of the respective apparatus is a power-on mode or a standby mode based on the detected response;

memory means for storing apparatus type information on the of the respective apparatus; and display control means for retrieving the apparatus type information of the respective apparatus from said memory means and for controlling a display to show the apparatus type of the respective apparatus and to show whether the power mode of the respective apparatus is the power-on mode, the standby mode, or the power-off mode.

2. An information processing apparatus according to claim 1, further comprising power input instructing means for receiving an external power-on command intended for the respective apparatus and for providing the power-on command to a power source of the respective apparatus via the network when the respective apparatus is in the standby mode.

3. An information processing apparatus according to claim 1, wherein the network includes an IEEE1394 serial bus.

4. An information processing apparatus according to claim 1, wherein said display control means causes the display to show an icon representing the respective apparatus, the appearance of the icon indicating the apparatus type of the respective apparatus and whether the power mode of the respective apparatus is the power-on mode, the standby mode, or the power-off mode.

5. An information processing apparatus according to claim 4, further comprising power input instructing means for receiving an external power-on command intended for the respective apparatus when the icon representing the respective apparatus is activated and for providing the power-on command to a power source of the respective apparatus via the network when the respective apparatus is in the standby mode.

6. An information processing apparatus according to claim 5, wherein said display control means causes the display to show an indication that the power-on command has been sent to the power source of the respective apparatus.

7. An information processing apparatus according to claim 1, further comprising further inquiring means for querying the respective apparatus as to the apparatus type of the respective apparatus and further discriminating means for determining whether a response has been received from the respective apparatus and for determining whether the received response is already stored in said storage means, and wherein said storage means stores the received response as the apparatus type information of the respective apparatus when the received response is not already stored in said storage means.

8. A mode display control method for an information processing apparatus connected to a plurality of other apparatuses via a network, said method comprising:

storing apparatus type information of a respective one of the plurality of other apparatuses;

querying the respective apparatus as to its power mode;

determining that the power mode of the respective apparatus is a power-off mode when a response from the respective apparatus is not detected;

when a response from the respective apparatus is detected, determining whether the power mode of the respective apparatus is a power-on mode or a standby mode based on the detected response;

retrieving the stored apparatus type information of the respective apparatus; and controlling a display to show the apparatus type of the respective apparatus and to show and whether the power mode of the respective apparatus is the power-on mode, the standby mode, or the power-off mode.

9. A method according to claim 8, wherein said querying, detecting, determining, storing, retrieving and controlling steps are repeated for each of the plurality of other apparatuses.

10. A method according to claim 8, wherein said controlling step causes the display to show an icon representing the respective apparatus, the appearance of the icon indicating the apparatus type of the respective apparatus and whether the power mode of the respective apparatus is the power-on mode, the standby mode, or the power-off mode.

11. A method according to claim 10, further comprising receiving an external power-on command intended for the respective apparatus when the icon representing the respective apparatus is activated and providing the power-on command to a power source of the respective apparatus via the network when the respective apparatus is in the standby mode.

12. A method according to claim 11, further comprising causing the display to show an indication that the power-on command has been sent to the power source of the respective apparatus.

13. A method according to claim 8, further comprising receiving an external power-on command intended for the respective apparatus and providing the power-on command to a power source of the respective apparatus via the network when the respective apparatus is in the standby mode.

14. A method according to claim 8, wherein the network includes an IEEE1394 serial bus, and said querying and detecting steps are performed via the IEEE1394 serial bus.

15. A method according to claim 8, further comprising further querying the respective apparatus as to the apparatus type of the respective apparatus prior to said step of querying the respective apparatus as to its power mode, and determining whether a response has been received from the respective apparatus and whether the received response is already stored, and wherein said storing step includes storing the received response as the apparatus type information of the respective apparatus when the received response is not already stored.

16. A recording medium recorded with a program for carrying out a mode display control method for an information processing apparatus connected to a plurality of other apparatuses via a network, said method comprising:

storing apparatus type information of a respective one of the plurality of other apparatuses;

querying the respective apparatus as to its power mode;

determining that the power mode of the respective apparatus is a power-off mode when a response from the respective apparatus is not detected;

when a response from the respective apparatus is detected, determining whether the power mode of the respective apparatus is a power-on mode or a standby mode based on the detected response;

retrieving the stored apparatus type information of the respective apparatus; and controlling a display to show the apparatus type of the respective apparatus and to show whether the power mode of the respective apparatus is the power-on mode, the standby mode, or the power-off mode.

17. A recording medium according to claim 16, wherein said querying, detecting, determining, storing, retrieving and controlling steps are repeated for each of the plurality of other apparatuses.

18. A recording medium according to claim 16, wherein said controlling step causes the display to show an icon representing the respective apparatus, the appearance of the icon indicating the apparatus type of the respective apparatus and whether the power mode of the respective apparatus is the power-on mode, the standby mode, or the power-off mode.

19. A recording medium according to claim 18, wherein said method further comprises receiving an external power-on command intended for the respective apparatus when the icon representing the respective apparatus is activated and providing the power-on command to a power source of the respective apparatus via the network when the respective apparatus is in the standby mode.

20. A recording medium according to claim 19, wherein said method further comprises causing the display to show an indication that the power-on command has been sent to the power source of the respective apparatus.

21. A recording medium according to claim 16, wherein said method further comprises receiving an external power-on command intended for the respective apparatus and providing the power-on command to a power source of the respective apparatus via the network when the respective apparatus is in the standby mode.

22. A recording medium according to claim 16, wherein the network includes an IEEE1394 serial bus, and said querying and detecting steps are performed via the IEEE1394 serial bus.

23. A recording medium according to claim 16, wherein said method further comprises further querying the respective apparatus as to the apparatus type of the respective apparatus prior to said step of querying the respective apparatus as to its power mode, and determining whether a response has been received from the respective apparatus and whether the received response is already stored, and wherein said storing step includes storing the received response as the apparatus type information of the respective apparatus when the received response is not already stored.

* * * * *

UNITED STATES PATENT AND TRADEMARK OFFICE
CERTIFICATE OF CORRECTION

PATENT NO. : 6,933,936 B1
DATED : August 23, 2005
INVENTOR(S) : Jun Hirai

It is certified that error appears in the above-identified patent and that said Letters Patent is hereby corrected as shown below:

Column 11,
Lines 4-5, "on the" should be deleted.

Column 12,
Line 4, "and" should be deleted.

Signed and Sealed this

Twenty-seventh Day of December, 2005

JON W. DUDAS
*Director of the United States Patent and Trademark Office*